United States Patent [19]

Bach

[11] Patent Number: 4,647,325
[45] Date of Patent: Mar. 3, 1987

[54] ULTRASONIC SPOT WELDING TIP ASSEMBLY AND METHOD FOR USING THE SAME

[75] Inventor: Gary Bach, Appleton, Wis.

[73] Assignee: Presto Products, Incorporated, Appleton, Wis.

[21] Appl. No.: 714,275

[22] Filed: Mar. 21, 1985

Related U.S. Application Data

[63] Continuation-in-part of Ser. No. 630,190, Jul. 12, 1984, Pat. No. 4,572,753.

[51] Int. Cl.$^4$ .............................................. B29C 65/08
[52] U.S. Cl. .................................. 156/73.1; 156/290; 156/308.4; 156/580.2; 264/23; 425/174.2
[58] Field of Search .................... 156/581, 73.1, 73.4, 156/290, 553, 580.1, 580.2, 157, 309.6, 380.8; 264/23; 425/174.2

[56] References Cited

U.S. PATENT DOCUMENTS

| | | | |
|---|---|---|---|
| Re. 28,642 | 12/1975 | Davis | 156/73.1 |
| 3,445,307 | 5/1969 | Balamuth et al. | 156/580.1 |
| 3,563,822 | 2/1971 | Fesh | 156/73.1 |
| 3,649,420 | 3/1972 | Obeda | 156/580.1 |
| 3,758,355 | 9/1973 | Witherow | 156/157 |
| 3,788,933 | 1/1974 | Nakazawa | 156/581 |
| 4,132,519 | 1/1979 | Reed | 425/174.2 |

Primary Examiner—Michael Wityshyn
Attorney, Agent, or Firm—Willian Brinks Olds Hofer Gilson & Lione Ltd.

[57] ABSTRACT

An ultrasonic welding tip assembly and associated method of use are described. The welding tips of the assembly may be conical with the cone height A and base width B having a ratio of A/B=1.2 or frusto-conical with a ratio of 0.76 in preferred embodiments. The welding tips are supported on anvils. In the welding process, the tips are only partially inserted into the material being welded so that the anvils remain spaced from the material. This space provides a reservoir into which molten material may flow away from the regions of the welding tips.

11 Claims, 5 Drawing Figures

ULTRASONIC SPOT WELDING TIP ASSEMBLY AND METHOD FOR USING THE SAME

This application is a continuation-in-part of prior application Ser. No. 630,190, filed July 12, 1984, now U.S. Pat. No. 4,572,753.

BACKGROUND OF THE INVENTION

This invention relates to an ultrasonic welding apparatus. More particularly, this invention relates to a spot welding tip for an ultrasonic welding apparatus.

Ultrasonic welding has been used for bonding in a number of materials. Most commonly, ultrasonic bonding is utilized in thermoplastic materials. Recently, it has been discovered that ultrasonic spot welding could be accomplished. See, for example, the November-December, 1980 issue of *Plastics Design Forum*, page 86. This publication describes techniques of ultrasonic spot welding as well as the advantages in producing a clean appearance on the surface opposite the weld. This article describes a process for welding two thermoplastic sheets together wherein a standard welding tip penetrates one sheet and extends halfway through the second. The article further addresses the possibility of inverse spot welding, that is, fitting the welding tip to a mounting fixture or anvil, and utilizing a flat-faced horn to provide ultrasonic energy.

The use of ultrasonic spot welding is further described in an article entitled "Ultrasonic Assembly", by R. A. Clarke, published in the 1980-81 *Modern Plastics Encyclopedia*, pgs. 447-450. In this article, Clarke discloses the general advantages of an annular ring design in the horn or tip for ultrasonic spot welding.

None of the above-referenced ultrasonic welding tip configurations or methods provide a suitable means for permitting the free flow of melted thermoplastic material away from the weld joint and tip therein during the welding process. The accummulation of melted material in this region may interfere with the continued melting of the unmelted material at the weld joint (it absorbs ultrasonic energy) and so lends itself to thermal degradation which may result in a weld joint of insufficient strength. Furthermore, this melted material may cause overheating of the weld tip configuration, which can damage the welds and surrounding sheet material.

SUMMARY OF THE INVENTION

It is a primary object of the present invention to provide an improved ultrasonic welding apparatus and method.

It is another object of the present invention to produce improved ultrasonic spot welds in sheet thermoplastic material.

It is still another object of the present invention to provide these welds along a relatively lengthy weld line and to produce these welds with a welding tip configuration which is self-releasing from the sheet material upon completion of the weld due to its full tapered symmetry.

It is a further object of the present invention to provide a welding tip of a sufficient height to provide a natural reservoir between the support base of the welding tip configuration and the weld tips per se.

It is a still further object of the present invention to provide removable weld tips and means for changing the number of welding tips and/or the size of the tips used in order to facilitate optimum weld strength along the line of the weld with varying materials and varying thicknesses to be welded.

It is yet another object of the present invention to provide optimally dimensioned and shaped weld tips to create optimum strength weld joints and smooth self-release of the tips from the melted sheet material.

The objects of the present invention are fulfilled by providing a system for spot welding a plurality of sheets of thermoplastic material together comprising:

(a) welding tip assembly adjacent to an obverse face of juxtaposed sheets of said thermoplastic material including an anvil, at least one welding tip extending therefrom, said welding tip having a base attached to said anvil and an apex spaced apart from said anvil at a predetermined height above said anvil;

(b) means for inserting said welding tip into an obverse face of said juxtaposed sheets a sufficient distance to at least partially penetrate each sheet of material being welded, said distance being less than the height of said welding tip to thereby provide a reservoir space between said anvil and the obverse face of sheet material; and (c) means for applying ultrasonic energy to said thermoplastic sheet material adjacent said welding tip;

whereby melted thermoplastic material may freely flow into said reservoir space.

A plurality of weld tip configurations are provided on a common support and the welding tips on the anvil of each are selectively removable to provide different weld tip configurations depending on the characteristics of the materials being welded.

The weld tip support is disposed along a weld line and the ultrasonic energy is applied by a welding horn extending along the weld line. The welding horn tends to generate weaker ultrasonic energy in peripheral regions, such as those adjacent the distal ends of the welding horn. Accordingly, to compensate for the weaker ultrasonic energy in these regions, the tips may be made slightly longer than in intermediate regions or the tips may be disposed in more shallow counterbores in the associated anvils to engage a greater diameter of the tip therefore displacing more material. An alternative approach would be to employ a welding horn of greater length than the weld line to avoid edge effects.

In preferred embodiments of the present invention, the welding tips are right circular cones with heights A above the anvil and base diameters B at the anvil. An ideal ratio of A/B is 1.2 in a first embodiment and 0.76 in a second embodiment. With these ratios, the tips are self-releasing and also penetrate sheet material with a minimum of energy.

BRIEF DESCRIPTION OF THE DRAWINGS

The present invention will become more fully understood from the detailed description given hereinbelow and the accompanying drawings which are given by way of illustration only and wherein.

DETAILED DESCRIPTION OF PREFERRED EMBODIMENTS

Figure 1:
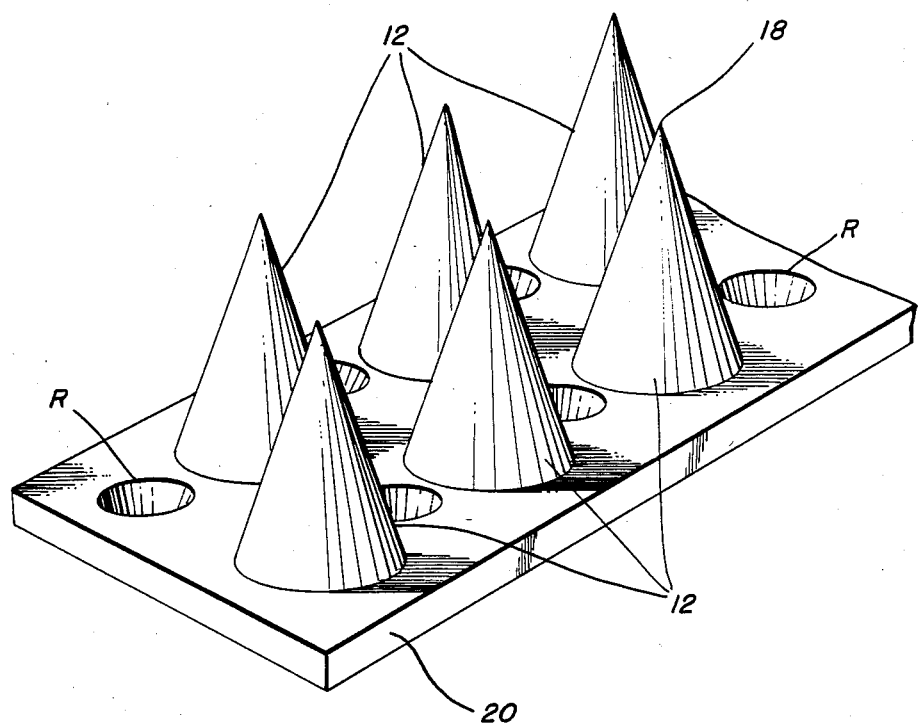
FIG. 1 is a perspective of a welding tip configuration of a first embodiment of the present invention.

Referring to FIG. 1, a single group of welding tips includes a plurality of staggered conical projections 12 removably mounted within the anvil body 20 or support plate 20. A plurality of optional drillformed well reservoirs R may be provided between projections 12. A plurality of such welding groups would typically be disposed along a welding line. The conical projections 12 serve to concentrate ultrasonic energy where they contact the sheet material at their respective apexes 18. While the conical projections 12 may be formed in any shape suitable for concentrating the ultrasonic energy and facilitating self-release, which will be described hereinbelow, FIG. 1 illustrates one form of cone. It should be noted that the term "cone" is intended to encompass its broadened meaning and is not intended to limit the present application to a right-circular cone which is merely one embodiment of cone useable in the welding tips of the present invention. For example, a pyramid also falls within the generic definition of a cone.

Figure 2:
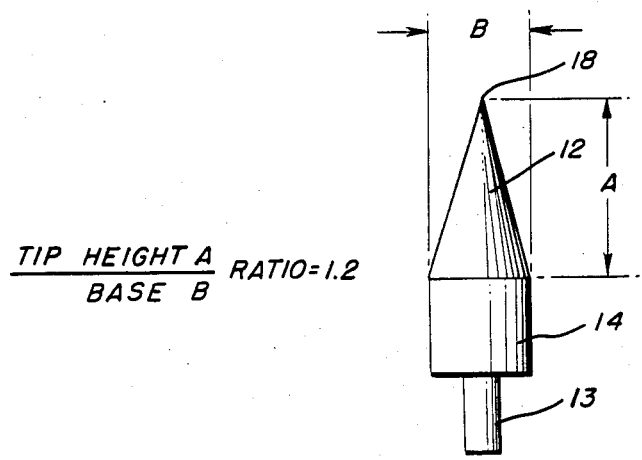
FIG. 2 is an enlarged frontal view of a single welding tip of the first embodiment of the present invention.

FIG. 2 is an enlarged diagrammatic illustration of a single welding tip of a first embodiment of the present invention. Welding tip 11 is a single unit comprising a shank 13, a base portion 14 having a diameter B and a conical projection 12 of a height A extending upwardly from this base portion. In a welding tip such as that illustrated in FIG. 2, the distance of height A between cone apex 18 and its junction with base portion 14 should be configured to equal approximately three times the thickness of a single sheet of material of two equal thickness sheets to be welded together. Further, the tip is preferably constructed such that the ratio of height A to width B of base portion 14 equals approximately 1.2.

Figure 3:
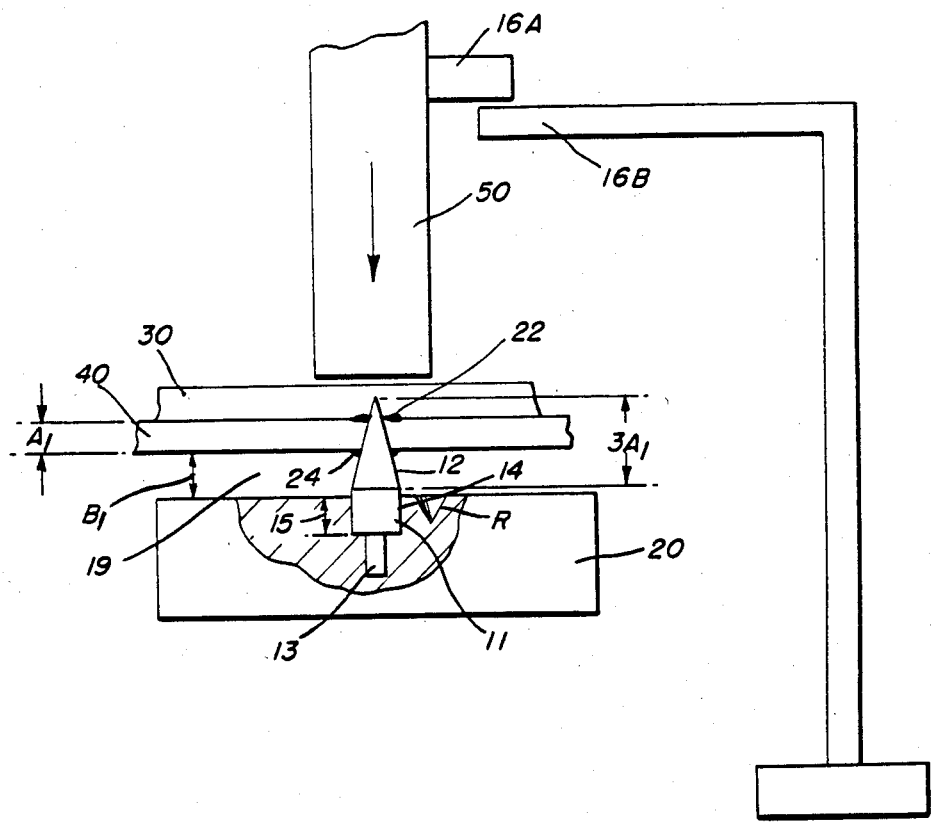
FIG. 3 is a schematic side view of the operation of a single welding tip of the type illustrated in FIG. 2 for welding sheet material in an inverse spot welding process utilizing a positive stop for the weld horn.

FIG. 3 is a diagrammatic side elevational view illustrating the operation of a single welding tip 11 of the present invention for welding sheet material in an inverse spot welding process. To facilitate inverse ultrasonic spot welding, the welding tip 11 is fastened to a stationary anvil or mounting bar 20, which is positioned on one side of two substantially equal-thickness sheets of material 30, 40 to be welded together. FIG. 3 further illustrates the placement of a movable horn 50 on the opposite side of the sheets of material to be bonded by spot welding according to the teachings of the present invention. A positive stop 16A mounted on the horn 50 is operatively associated with a stationary stop 16B to limit the downward stroke of the horn. As horn 50 is lowered, it pushes sheets 30 and 40 against welding tip 11, causing cone 12 to pierce sheet 40 and penetrate sheet 30 by approximately half its thickness. The degree of penetration is, of course, controlled by the positions of stops 16A, 16B. Therefore, approximately 1.5 sheet thicknesses $A_1$ are penetrated by cone 12. Cone 12 has a height of approximately $3A_1$ (3 times the sheet thickness. Accordingly, a free reservoir space 19 of a thickness $B_1$ results between sheet 40 and anvil 20.

Ultrasonic energy is applied to the sheets of material to be bonded via the ultrasonic horn 50. As the plurality of conical projections 12 of the ultrasonic welding tips 11 penetrate the sheet material along the weld line, the ultrasonic energy is concentrated at these spots. The sheet material is thereby softened, forming melt pools 22 between the sheets. Molten material, as at 24, is also accumulated in the free space 19 between anvil 20 and sheet 40. As stated hereinbefore, space 19 is created by stops 16A and 16B which allows the cones 12 to be inserted only through sheet 40 and approximately half the sheet thickness into sheets 30. The back flow of molten material produced by the ultrasonic welding action literally hangs at 24 from the sheets 30, 40 above the anvil 20. The free flow of the molten sheet material effectively removes a substantial portion of molten material from the region of the ultrasonic energy concentration and avoids overheating of the molten material so removed. Thus, ultrasonic energy can be better concentrated on unsoftened material to continue the welding process.

When the spot welds have been completed to their desired depth (1.5 times the thickness of the bottom sheet 40, the positive stops 16A, 16B controlling this distance), the application of ultrasonic energy is terminated. Cooling of the sheet thermoplastic causes shrinkage thereof. The configuration of the conical projections 12 is such that the cone 12 of welding tip 11 self-releases from the sheet material.

Thus, the configuration of the welding tip of FIGS. 1, 2 and 3 facilitates self release of the tip from the sheet material after welding and produces improved welds by providing a natural reservoir space for accumulating a substantial portion of the softened or molten sheet material flowing from positions juxtaposed to the conical projections 12.

Further, the pointed and elongated tip portion 12 with a height-to-base ratio of approximately 1.2, as illustrated in FIG. 2, allows for an enhanced piercing action through the sheet material which requires less load on the power supply during the welding process and still provides adequate weld strength.

Still further, the taper on the conical projection 12 is about 45°, resulting in less displaced melted sheet material and provides a cosmetically more acceptable weld.

While the FIG. 3 embodiment of the present invention illustrates the technique known as inverse spot welding, it is also possible to utilize the tip of the present invention in normal spot welding by affixing the tip to the ultrasonic horn 50.

Figure 4:
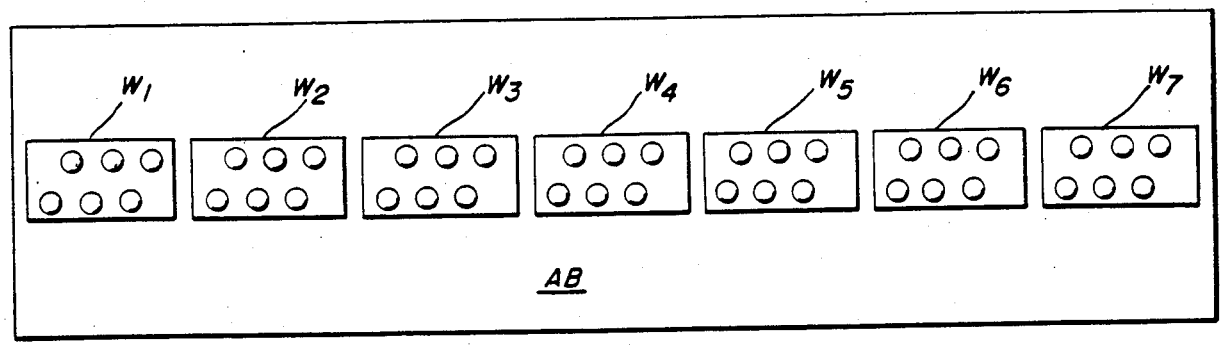
FIG. 4 is a top plan view of an anvil support bar illustrating a plurality of weld tip groups extending along a weld line.

The outer zones of an ultrasonic welding horn 50, typically generate lower amplitude ultrasonic energy and therefore produce weaker welds at the outer peripheral zones of the horn. In accordance with the present invention as illustrated in FIG. 4, weld tip groups $W_1$ and $W_7$ in the peripheral outer zones of an anvil support bar AB have a counterbore depth (15, FIG. 3) for placement of the base of the removably mounted tips which is about 0.010 inches shallower than the counterbores of the remaining tip groups $W_2$ to $W_6$ on the anvil support bar along the weld line. Thus, cones 12 in tip groups $W_1$ $W_7$ penetrate further into sheets 30, 40. This compensates for the inherent feature of lower power output at outer zones of the ultrasonic horn 50.

The shanks 13 and bases 14 of welding tips 11 are removably mounted in the anvil body 20 in counterbore sockets, as illustrated in FIG. 3, for ease of maintenance and replacement. More importantly, the number of tips in each grouping and the size of the tips in each grouping on the anvil may be easily changed to vary the optimum weld strength along a weld line. This permits the welding of a wider variety of polymer materials and/or a wider range of varying sheet thicknesses even though generally more melt pools per grouping will result in a higher tensile strength per group.

In the preferred embodiment, the welding tips of the present invention are utilized to spot weld high-density polyethylene sheet. However, any suitable material may be welded utilizing the welding apparatus of the present invention.

Similarly, in the present invention, the welding horn could be made of any suitable material as can the welding tip 11 of the present invention. In the preferred embodiment, the welding tips 11 are manufactured of aluminum and is then hard-coat anodized for better abrasion resistance. The tip is then treated with polytetrafluoroethylene, known under the tademark "TEFLON", to prevent surface sticking. Further, the welding tip 11 can also be manufactured from other materials such as carbonized steel with proper heat treatment.

Previously, the use of this type system in automated production resulted in residual heat buildup within the welding tip. Cooling passages had to be provided within the anvils in order to control the temperature of the welding tips. In the present invention proper tip geometry and number of tips per group along the weld line reduce residual heat buildup as disclosed hereinabove. Still further, since the anvil never contacts the molten material or sheets being welded, less heat is applied to the anvil.

Figure 5:
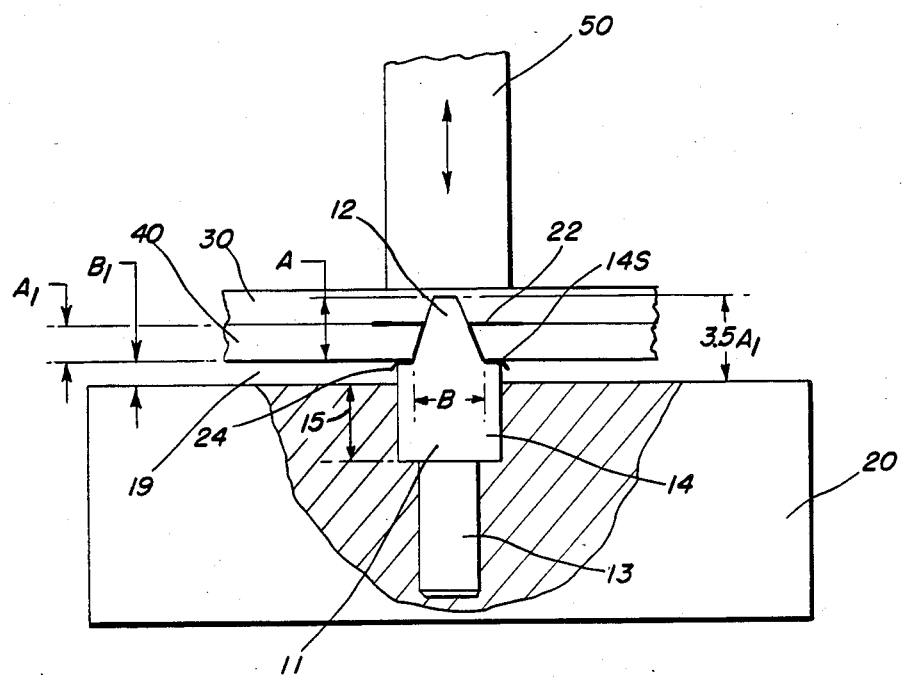
FIG. 5 is a second embodiment of a weld tip according to the present invention for welding sheet material in an inverse spot welding process which permits the elimination of the positive stop of FIG. 3.

FIG. 5 is an enlarged diagrammatic illustration of a single welding tip of a second embodiment of the present invention as utilized in an inverse welding process. Welding tip 11 is a single unit comprising a shank 13, a base portion 14 having a diameter B and a frusto-conical projection 12 of a height A extending upwarding from this base portion. It should be understood that the welding tip of FIG. 5 may be substituted for the welding tip of FIG. 2 in the illustrations of FIGS. 1 and 4 according to the present invention. In a welding tip such as that illustrated in FIG. 5, the distance of height A between the distal end or apex of the cone and its junction with base portion 14 should be configured to equal approximately one and one-half times the thickness of a single sheet of material of two equal thickness sheets to be welded together. Further, the tip is preferably constructed such that the ratio of height A to width B of base portion 14 equals approximately 0.76.

FIG. 5 also illustrates the operation of the second embodiment of a single welding tip 11 of FIG. 5 for welding sheet material in an inverse spot welding process. To facilitate inverse ultrasonic spot welding, the welding tip 11 is fastened to a stationary anvil or mounting bar 20, which is positioned on one side of two substantially equal-thickness sheets of material 30, 40 to be welded together. FIG. 5 further illustrates the placement of a movable horn 50 on the opposite side of the sheets of material to be bonded by spot welding according to the teachings of the present invention.

With the welding tip of FIG. 5, the positive stop 16A of FIG. 3 may be eliminated or, if desired, it may be retained. As horn 50 is lowered, it pushes sheets 30 and 40 against weld tip 11, causing frusto-conical tip 12 to pierce sheet 40 and penetrate sheet 30 by more than half its thickness. The degree of penetration is, of course, controlled by the height of the frustoconical tip 12 above the shoulder 14S of base 14 of the welding tip 11. Therefore, more than 1.5 sheet thicknesses $A_1$ are penetrated by frusto-conical tip 12. The height of frusto-conical tip 12 plus the extension of base 14 above the top of anvil body 20 is approximately $3.5A_1$ (3.5 times the sheet thickness). Accordingly, a free reservoir space 19 of a thickness $B_1$ results between sheet 40 and anvil 20.

Ultrasonic energy is applied to the sheets of material to be bonded via the ultrasonic horn 50. As the plurality of conical projections 12 of the ultrasonic welding tips 11 penetrate the sheet material along the weld line, the ultrasonic energy is concentrated at these spots. The sheet material is thereby softened, forming melt pools 22 between the sheets. Molten material, as at 24, is also accumulated in the free space 19 between anvil 20 and sheet 40. As stated hereinbefore, space 19 is created by the extension of base 14 and shoulder 14S above the top of anvil 20, which allows the frusto-conical tips 12 to be inserted to the controlled depth of the tips' height into sheets 30, 40. As in the FIG. 3 embodiment, the back flow of molten material produced by the ultrasonic welding action literally hangs at 24 from the sheets 30, 40 above the anvil 20. The free flow of the molten sheet material effectively removes a substantial portion of molten material from the region of the ultrasonic energy concentration and avoids overheating of the molten material so removed. Thus, ultrasonic energy can be better concentrated on unsoftened material to continue the welding process.

When the spot welds have been completed to their desired depth (the shoulder 14S of base 14 controlling this distance), the application of ultrasonic energy is terminated. Cooling of the sheet thermoplastic causes shrinkage thereof. The configuration of the frusto-conical tips 12 is such that the tip 12 of welding tip 11 self-releases from the sheet material.

Further, the shoulder 14S of base 14 as it extends a distance $B_1$ above the top of the anvil body 20 also disburses evenly and radially the molten material between the juxtaposed sheets, producing a uniform, and therefore stronger, weld due to the pressure exerted on the sheets 30 and 40 by the horn 50 against the shoulder 14S of base 14.

Still further, the taper on the frusto-conical tip 12 is about 45°, resulting in less displaced melted sheet material and provides a cosmetically more acceptable weld.

It should become apparent to one of ordinary skill in the art that various changes and modifications may be made in the device of the present invention which are within the contemplation of the inventor. Thus, the scope of the present application should not be construed as limited by the specification of drawings thereof, but must be determined from review of the claims included herewith.

What is claimed is:

1. A method of spot welding a plurality of sheets of thermoplastic material together comprising the steps of:
   (a) providing a plurality of welding tips adjacent to an obverse face of juxtaposed sheets of said thermoplastic material, each of said welding tips extending from an anvil and having a base attached to said anvil and an apex spaced from said anvil at a predetermined height above said anvil, said plurality of welding tips extending along a weld line to be formed in said juxtaposed sheets;
   (b) inserting said welding tips into an obverse face of said juxtaposed sheets a sufficient distance so that each welding tip at least partially penetrates each sheet of material being welded, said distance being less than the height of said apex of said each welding tip above the anvil from which said each welding tip extends, to thereby provide a reservoir space between said anvil and the obverse face of said sheet material; and (c) applying ultrasonic energy to said thermoplastic sheet material adjacent to said welding tips, said ultrasonic energy being applied by a welding horn extending along the entire length of said weld line and the ultrasonic energy applied adjacent to the distal ends of said weld line being slightly weaker than at intermediate positions along said line, the welding tips adjacent to the distal ends of said weld line having heights slightly greater than the heights of the welding tips intermediate the distal ends of said weld line.

2. A system for spot welding a plurality of sheets of thermoplastic material together comprising:

(a) a plurality of welding tips adjacent to an obverse face of juxtaposed sheets of said thermoplastic material, each of said welding tips extending from an anvil and having a base attached to said anvil and an apex spaced from said anvil at a predetermined height above said anvil, said plurality of welding tips extending along a weld line to be formed in said juxtaposed sheets;

(b) means for inserting said welding tips into an obverse face of said juxtaposed sheets a sufficient distance so that each welding tip at least partially penetrates each sheet of material being welded, said distance being less than the height of said apex of said each welding tip above the anvil from which said each welding tip extends, to thereby provide a reservoir space between said anvil and the obverse face of said sheet material; and (c) means for applying ultrasonic energy to said thermoplastic sheet material adjacent to said welding tips, said ultrasonic energy being applied by a welding horn extending along the entire length of said weld line and the ultrasonic energy applied adjacent to the distal ends of said weld line being slightly weaker than at intermediate positions along said line, the welding tips adjacent to the distal ends of said weld lines having heights slightly greater than the heights of the welding tips intermediate the distal ends of said weld line.

3. The system of claim 2. wherein said means for inserting includes: means for moving said welding horn against an opposite face of said juxtaposed sheets from said obverse face to thereby push said sheets onto said welding tips; and stop means for stopping the movement of said welding horn when said welding tip penetrates into said sheets by said sufficient distance.

4. The system of claim 2 wherein the welding tips are selectively removable from the anvil from which they extend.

5. The system of claim 2 wherein the welding tips are cone-shaped, the base of each of said cone-shaped welding tips being supported on a major surface of the anvil from which it extends and having a maximum base dimension parallel to said major surface, the ratio of said predetermined height of said tip to said base dimension being approximately 1.2.

6. The system of claim 5 wherein the welding tips are right circular cones and wherein said base dimension is the base diameter thereof.

7. The system of claim 2 wherein the plurality of welding tips are staggered in two parallel rows along the welding line.

8. The system of claim 2 wherein the plurality of welding tips are clustered in groups.

9. The system of claim 2 wherein the welding tips are frustro-conical in shape, the base of each of said welding tips being supported by a major surface of the anvil from which it extends and having a maximum base dimension parallel to said major surface, the ratio of said predetermined height of said frustro-conical shaped tip to said base dimension being approximately 0.76.

10. The system of claim 9 wherein said frustro-conical shaped welding tip is a portion of a right circular cone, and said base dimension is the base diameter thereof.

11. The system of claim 9 wherein the frustro-conical welding tip is supported by a cylindrical projection, the diameter of said cylindrical projection being larger than said base dimension, thereby providing a shoulder around said base, whereby said shoulder acts as a stop against said obverse face.

* * * * *

UNITED STATES PATENT AND TRADEMARK OFFICE
CERTIFICATE OF CORRECTION

PATENT NO. : 4,647,325

DATED : March 3, 1987

INVENTOR(S) : Gary Bach

It is certified that error appears in the above-identified patent and that said Letters Patent is hereby corrected as shown below:

IN THE BACKGROUND OF THE INVENTION

In column 1, line 39, please delete "accummulation" and substitute therefor --accumulation--.

IN THE BRIEF DESCRIPTION OF THE DRAWINGS

In column 2, line 58, after the word "perspective" please insert --view--;

IN THE DETAILED DESCRIPTION OF PREFERRED EMBODIMENTS

In column 3, line 11, please delete "drillformed" and substitute therefor --drill-formed--;

In column 3, lines 62-63, before the word "Accordingly", please delete "thickness" and substitute therefor --thickness)--.

In column 4, line 6, please delete "allows" and substitute therefor --allow--;

In column 5, line 13, please delete "and is" and substitute therefor --and are--;

UNITED STATES PATENT AND TRADEMARK OFFICE
CERTIFICATE OF CORRECTION

PATENT NO. : 4,647,325

DATED : March 3, 1987

INVENTOR(S) : Gary Bach

It is certified that error appears in the above-identified patent and that said Letters Patent is hereby corrected as shown below:

In column 5, line 34, please delete "upwarding" and substitute therefor --upwardly--;

In column 6, line 48, please delete "specification of" and substitute therefor --specification or--.

IN THE CLAIMS

In claim 2 (column 7, line 41), please delete "weld lines" and substitute therefor --weld line--;

In claim 9 (column 8, lines 27 and 31), in both occurrences, please delete "frustro-conical" and substitute therefor --frusto-conical--;

In claim 10 (column 8, line 33), please delete "frustro-conical" and substitute therefor --frusto-conical--;

In claim 11 (column 8, line 37), please delete "frustro-conical" and substitute therefor --frusto-conical--.

Signed and Sealed this

Fifteenth Day of November, 1988

*Attest:*

DONALD J. QUIGG

*Attesting Officer*   *Commissioner of Patents and Trademarks*